United States Patent
Carpenter et al.

(10) Patent No.: US 12,191,762 B2
(45) Date of Patent: Jan. 7, 2025

(54) LOW I/O CURRENT SHARING ARCHITECTURE FOR MULTIPHASE DC-DC CONVERTERS

(71) Applicant: DONGGUAN CHANGGONG MICROELECTRONICS LTD, Dongguan (CN)

(72) Inventors: Brian Carpenter, Cary, NC (US); Xuening Li, Dongguan (CN)

(73) Assignee: INNOVISION SEMICONDUCTOR INC. (CN)

( * ) Notice: Subject to any disclaimer, the term of this patent is extended or adjusted under 35 U.S.C. 154(b) by 209 days.

(21) Appl. No.: 17/831,400

(22) Filed: Jun. 2, 2022

(65) Prior Publication Data

US 2023/0396159 A1 Dec. 7, 2023

(51) Int. Cl.
*H02M 3/04* (2006.01)

(52) U.S. Cl.
CPC .................... *H02M 3/04* (2013.01)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/12; H02M 3/3155; H02M 7/1557; H02M 7/1626; H02M 1/4208; H02M 7/12; H02M 7/219; H02M 7/151; H02M 1/4233; H02M 5/4585;

(Continued)

(56) References Cited

U.S. PATENT DOCUMENTS

| | | | |
|---|---|---|---|
| 11,228,248 B1 * | 1/2022 | Zafarana | H03K 5/08 |
| 2013/0058378 A1 * | 3/2013 | Zambetti | G01K 7/24 374/185 |

(Continued)

*Primary Examiner* — Sean Kayes
*Assistant Examiner* — Nusrat Quddus
(74) *Attorney, Agent, or Firm* — Mark Luo

(57) ABSTRACT

Large semiconductor ICs provide the processing power for billions of electronic devices used in every facet of modern life. Multiphase converters are the most common means of providing the current required for these CPUs, GPUs, and ASICs. Contemporary designs require 8, 12, 16, and even higher phase counts. Existing designs require each phase provide an independent current feedback line to the multiphase controller for current sharing purposes; this drastically increases the pin count of the controller and creates congestion in PCB routing. Our new idea moves the current sharing function to the power stage element, thereby reducing the cost of the controller and the complexity of the PCB.

1 Claim, 3 Drawing Sheets

(Example Power Stage Block Diagram)

(58) Field of Classification Search
CPC ............ H02M 7/1552; H02M 7/1623; H02M 1/4225; H02M 3/073; H02M 3/10; H02M 3/135; H02M 3/137; H02M 7/00; H02M 7/064; Y02B 70/1491; H02J 3/46; H02J 3/38; H02J 7/12; G05F 1/30; G05F 1/33; G05F 1/32; G05F 1/34; G05F 1/38; G05F 1/52

See application file for complete search history.

(56) References Cited

U.S. PATENT DOCUMENTS

| | | | |
|---|---|---|---|
| 2014/0032942 A1* | 1/2014 | Takehara | G06F 1/26 713/300 |
| 2017/0229961 A1* | 8/2017 | Zhang | H02M 3/1584 |
| 2017/0346385 A1* | 11/2017 | Liang | H02M 3/158 |
| 2023/0396141 A1* | 12/2023 | Abesingha | H02M 3/158 |

* cited by examiner (Preferred Embodiment)

(Example Power Stage Block Diagram)

LOW I/O CURRENT SHARING ARCHITECTURE FOR MULTIPHASE DC-DC CONVERTERS

TECHNICAL FIELD

This invention relates to electronics, and more specifically to current balancing of multiphase converters.

BACKGROUND

As compute processing power requirements increase, the problems associated with supplying power to the processors have been solved by balancing multiple power processing phases switched out-of-phase to provide the required load current. One factor influencing the success of multi-phase converters is the ability to balance the load current between phases. Without current balancing, one of the phases will carry more current than the others, potentially resulting in thermal and system overload problems.

Typically, multi-phase pulse-width modulated (PWM) converters with various control schemes (current mode, voltage mode, constant on-time, etc.) in digital or analog form provide the underlying control architecture. To these, a secondary control loop is added to provide the current sharing function. The predominant architecture is for the controller to embody the regulation and current sharing functions via their PWM outputs.

A power stage (PS) performs the power processing. The PS consists of power switches, a driver to convert the PWM signals to be compatible with the power switches; current and thermal sensing circuits report the current and thermal status back to the controller.

Current systems require a current sense connection from each power stage. As processing IC current requirements grow ever higher, some ICs need sixteen or more phases. This adds to the pin count, package size, and cost of the controller, or requires 'stacking' multiple controllers at an even higher cost.

SUMMARY

The present invention moves the current sharing function to the power stages. This architecture has multiple benefits, the largest of which is reducing the pin-count and complexity (and so, cost) of the controller without adding to the pin count of the PS.

A second benefit of this architecture is to simplify the ability to thermally match the power stages. This is envisioned as a configurable option. If enabled, the PS looks at the common TAO pin where the voltage signifies the temperature of the hottest power stage. If it is cooler, it slowly increases its current until its temperature is at the TAO pin level. In this manner, power stages may be all made to run at the same temperature automatically, enhancing system reliability.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

This invention relates to electronics, and more specifically to a system and method to balance current in a multiphase converter system. As one example, such a multi-phase converter system includes a balancing circuit in the power stages that can balance the current in the different phases by modulating the current in at least one of a plurality of phases independently. As used herein, current balancing can mean an adjustment to achieve equal balance (e.g., equalized current) or it can be employed to achieve other proportional relationships between the phases, including active current balance to achieve thermal balance. The modulation can be implemented by individually modulating each phase or phases based on the difference between the current detected for a given phase relative to the average current for the entire multiphase network. To achieve this functionality, the system can include a current sensor configured to sense current and an averaging circuit which determines the average current for the multi-phase network. The modulator for each phase modulates each phase with respect to the average current.

Figure 1:
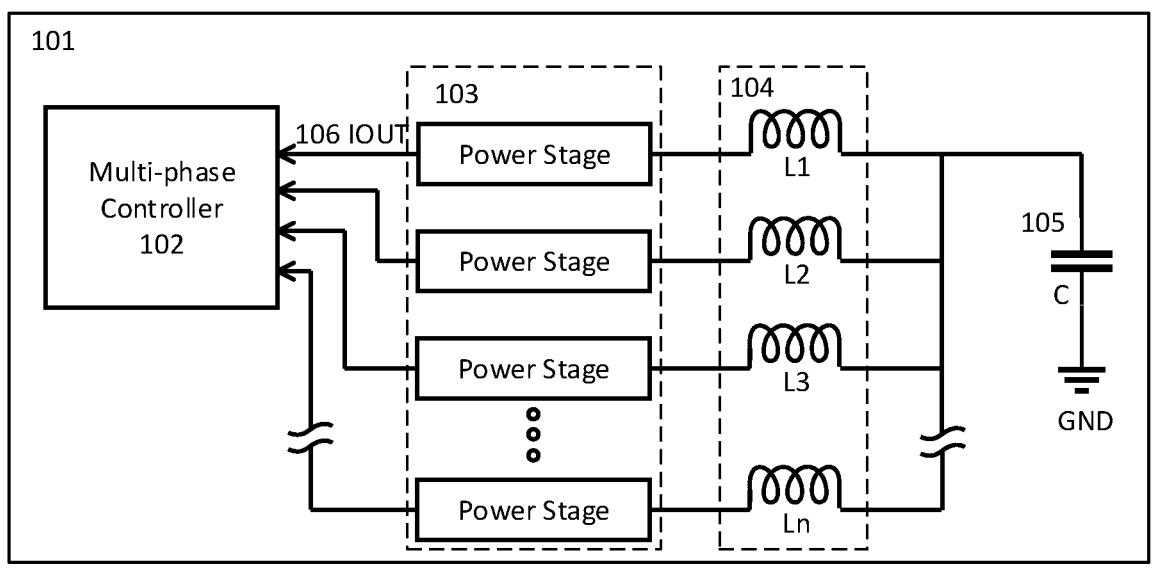
FIG. 1 illustrates an example of existing multi-phase power system current sharing connections.

FIG. 1 depicts the existing multi-phase power system 101. Assuming the number of phases for this multi-phase power system is "n", this system includes a multi-phase controller 102, n power stages 103, n inductors 104 and an output capacitor 105. Each power stage requires a discrete connection from its IOUT pin 106 to the multi-phase controller 102 to send the current sensing signal of this power stage. The current balancing control algorithm is implemented by the multi-phase controller 102.

Figure 2:
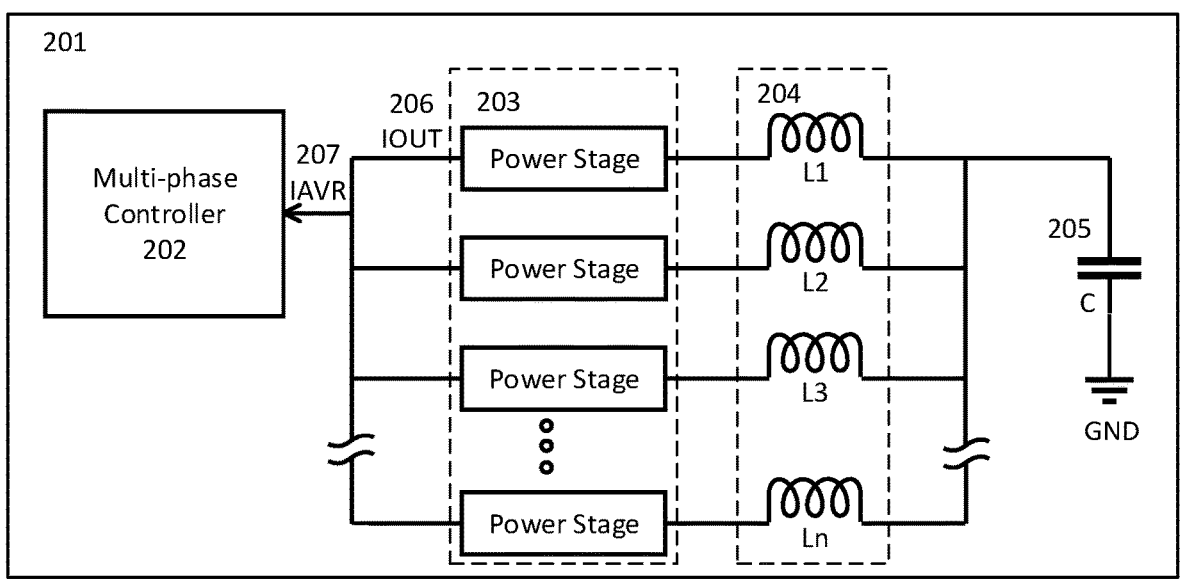
FIG. 2 illustrates an example of a current sharing system constructed in accordance with the invention.

FIG. 2 illustrates the preferred embodiment 201, which also includes a multi-phase controller 202, n power stages 203, n inductors 204 and an output capacitor 205. Different from the existing multi-phase solution, all power stages' IOUT pin 206 are connected to form a node IAVR 207. Thus, only one pin is needed on the multi-phase controller 202 to measure the IAVR signal 207. Each power stage then modulates its current with respect to the average current of the system on the IOUT pin 206.

Figure 3:
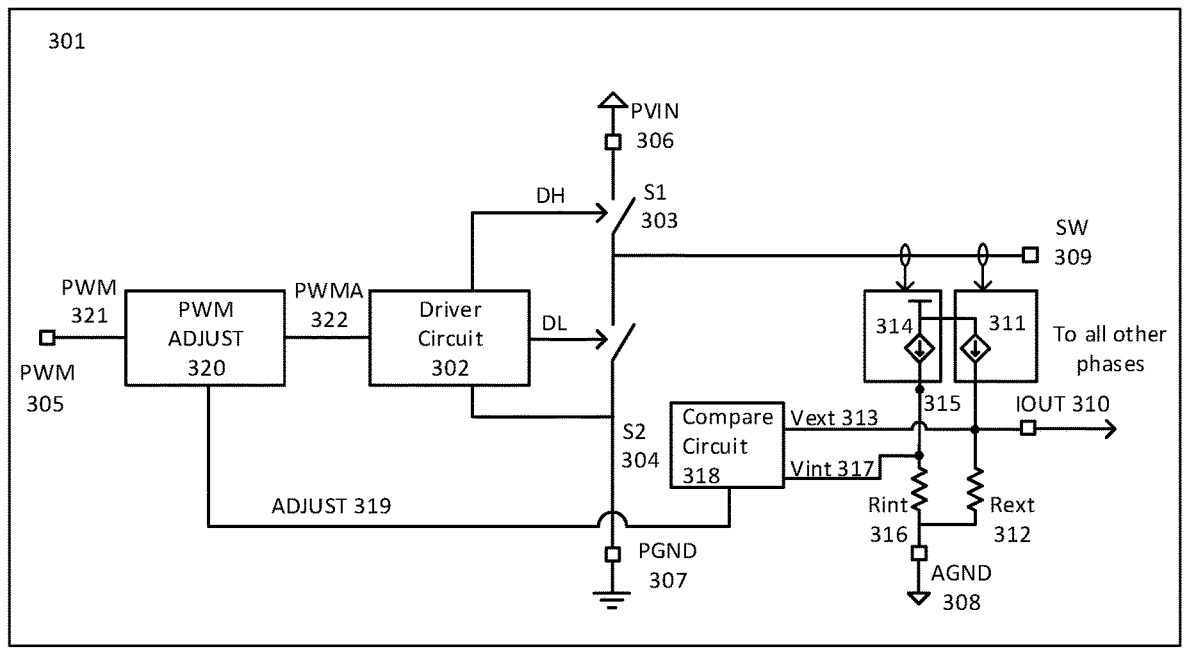
FIG. 3 illustrates an example power stage block diagram constructed in accordance with the invention.

The means to achieve current balancing on a per-phase basis is shown in FIG. 3. The power stage 301 design is identical to existing power stages, which includes a driver circuit 302, two power switches: S1 303 and S2 304, PWM terminal 305, PVIN terminal 306, PGND terminal 307, AGND terminal 308, SW terminal 309, IOUT terminal 310, a current mirror circuit 311, which produces a current on IOUT terminal 310, and this current is proportional to the current that flows through the SW terminal 309. For each power stage chip, an external resistor Rext 312 is connected between the IOUT terminal 310 and the AGND terminal 308 to convert the measured current into voltage signal Vext 313. The proposed invention on power stage has the following additions:

A current mirror circuit 314, which is identical to the existing current mirror circuit 311, and its output terminal 315, A resistor that connects between the output terminal 315 and the AGND terminal 308 to convert the output current produced by the current mirror circuit 314 into a voltage signal Vint 317.

A circuit 318 to compare the voltages Vint 317 and Vext 313 and outputs the ADJUST signal 319 to provide information to the PWM ADJUST block 320 if any adjustments to the incoming PWM signal 321 are required.

The PWM adjust block 320, which adjusts the PWM signal 321 provided to the drivers (PWMA 322) according to the ADJUST signal 319 information. PWM ADJUST 319 can alternately narrow or widen PWM based on ADJUST or be implemented as a unidirectional (only widen or only narrow) function.

The entire process can be implemented in either analog or digital form. In addition, in a frequency modulated converter, PWM ADJUST can provide a variable time delay to achieve current balance.

What is claimed is:

1. A multi-phase converter system, comprising:
two or more power stage chips, wherein each power stage chip further comprises:
  a pulse-width modulation (PWM) pin;
  a powering voltage input (PVIN) pin;
  a ground (GND) pin;
  a switching node (SW) pin;
  two internal switches controlled by a PWM signal of a multiphase controller chip to produce the desired PWM signal at the SW pin;
  a driver circuit;
  a current monitoring (IMON) pin;
  a first current mirror circuit to output a current through the IMON pin that is proportional to the current through the SW pin;
  a second current mirror circuit to produce a current that is proportional to the current flow through the SW pin of the power stage chips;
  a resistor Rint, located either outside or inside the power stage chip, to allow the current of the second current mirror circuit to flow through to generate a voltage signal: Vint;
  a circuit to compare the Vint and the voltage on the IMON pin, and generate an ADJUST signal; and
  a PWM adjust block to adjust the PWM signal according to the ADJUST signal;
the multi-phase controller chip to generate multiple PWM signals, wherein the multi-phase controller chip further comprises a pin connected to all the IMON pins of all the power stage chips to measure an analog signal;
two or more inductors, wherein one terminal of each inductor is connected to the SW pin while the other terminal of all the inductors is connected together to form an output terminal: Vout;
a ground terminal; and
one or more output voltage filter capacitors, wherein the output voltage filter capacitor is connected between the Vout and the ground terminal for filtering out the high frequency current ripple and can be implemented by one single output voltage filter capacitor or by paralleling multiple output voltage filter capacitors.

\* \* \* \* \*